(12) United States Patent
Chow et al.

(10) Patent No.: US 12,548,024 B2
(45) Date of Patent: Feb. 10, 2026

(54) USING UNIQUE IDENTIFIER TO SUPPLY USER PROFILE INFORMATION

(71) Applicant: Capital One Services, LLC, McLean, VA (US)

(72) Inventors: Chih-Hsiang Chow, Coppell, TX (US); Ankit Kothari, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 101 days.

(21) Appl. No.: 18/169,519

(22) Filed: Feb. 15, 2023

(65) Prior Publication Data

US 2024/0273532 A1 Aug. 15, 2024

(51) Int. Cl.
*G06Q 20/40* (2012.01)

(52) U.S. Cl.
CPC .............................. *G06Q 20/4014* (2013.01)

(58) Field of Classification Search
CPC ................................................... G06Q 20/4014
See application file for complete search history.

(56) References Cited

U.S. PATENT DOCUMENTS

| | | | |
|---|---|---|---|
| 7,552,074 B2 | 6/2009 | Bruce et al. | |
| 8,041,954 B2* | 10/2011 | Plesman | H04L 9/3226 726/16 |
| 9,760,697 B1* | 9/2017 | Walker | G06F 21/6245 |
| 2009/0094124 A1 | 4/2009 | Foss, Jr. | |
| 2013/0212704 A1* | 8/2013 | Shablygin | G06F 21/6218 726/28 |
| 2018/0005239 A1* | 1/2018 | Schlesinger | G06K 19/06028 |
| 2018/0337907 A1* | 11/2018 | Bhansali | H04L 9/3231 |

* cited by examiner

*Primary Examiner* — Peter D Nolan
*Assistant Examiner* — Matthew Cobb
(74) *Attorney, Agent, or Firm* — Harrity & Harrity, LLP

(57) ABSTRACT

In some implementations, a system for supplying user profile information may store, in an encrypted data repository, user profile information associated with a unique identifier. The system may receive, from a requester device, a request for the user profile information associated with the unique identifier, wherein the request may be associated with an application program interface call requesting approval to use the unique identifier. The system may communicate with a user device associated with the unique identifier to authenticate an identity associated with a user operating the user device. The system may provide the user profile information associated with the unique identifier to the requester device based on receiving information to authenticate the identity associated with the user operating the user device and verify that the user authorizes supplying the user profile information to the requester device.

20 Claims, 5 Drawing Sheets

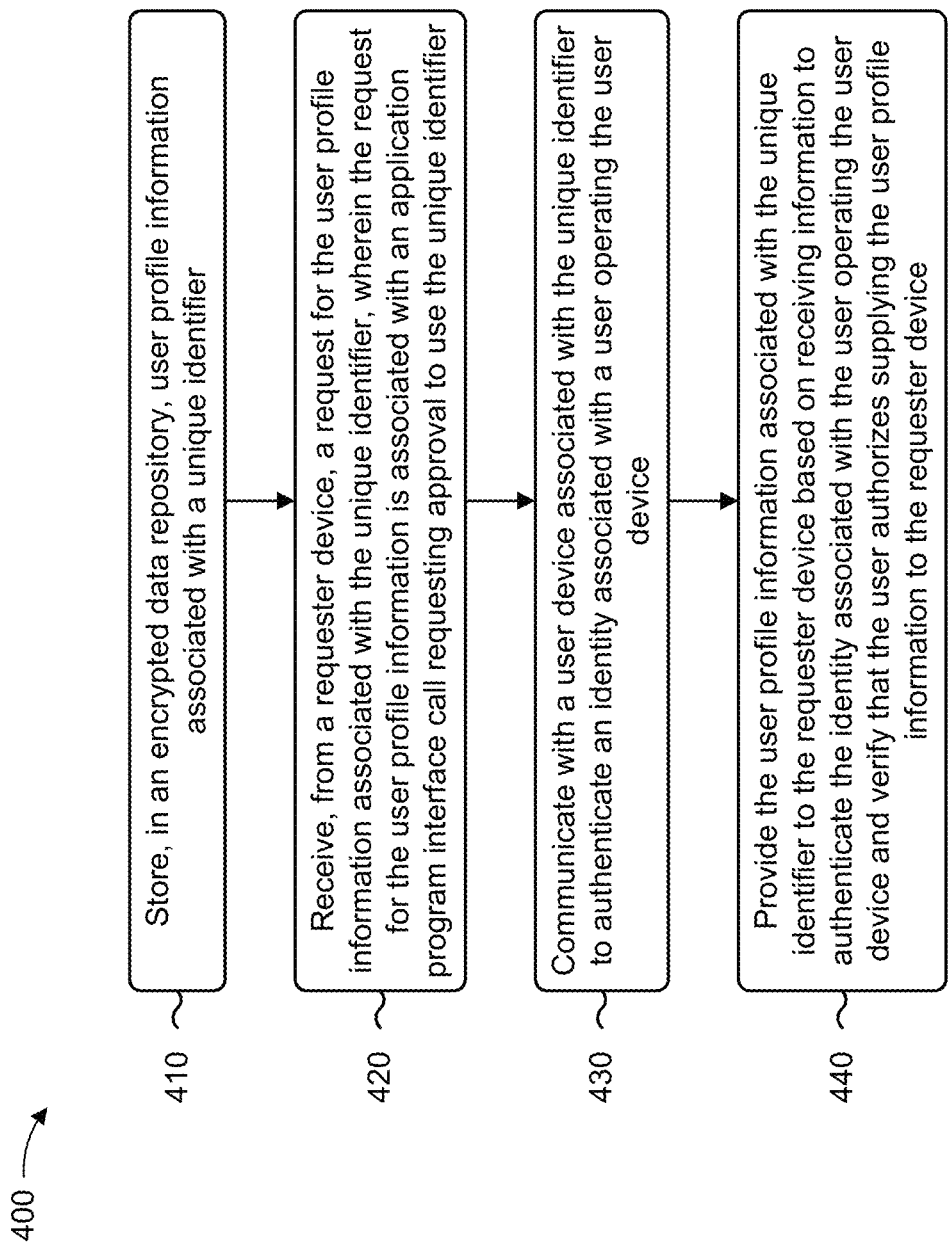

USING UNIQUE IDENTIFIER TO SUPPLY USER PROFILE INFORMATION

BACKGROUND

Contact information generally refers to any suitable information that may be needed to communicate with a person or organization, whether through electronic or physical channels. For example, contact information associated with a person may include details such as a name, a mailing address, a telephone number, and/or an email address.

SUMMARY

Some implementations described herein relate to a system for supplying user profile information. The system may include one or more memories and one or more processors coupled to the one or more memories. The one or more processors may be configured to store, in an encrypted data repository, user profile information associated with a unique identifier. The one or more processors may be configured to receive, from a requester device, a request for the user profile information associated with the unique identifier, wherein the request for the user profile information is associated with an application program interface (API) call requesting approval to use the unique identifier. The one or more processors may be configured to communicate with a user device associated with the unique identifier to authenticate an identity associated with a user operating the user device. The one or more processors may be configured to provide the user profile information associated with the unique identifier to the requester device based on receiving information to authenticate the identity associated with the user operating the user device and verify that the user authorizes supplying the user profile information to the requester device.

Some implementations described herein relate to a method for sharing user profile information. The method may include storing, by a profile sharing device, user profile information associated with a unique identifier. The method may include receiving, by the profile sharing device from a requester device, a request for the user profile information associated with the unique identifier, wherein the request for the user profile information is associated with an API call requesting approval to use the unique identifier. The method may include communicating, by the profile sharing device, with a user device associated with the unique identifier to authenticate an identity associated with a user operating the user device. The method may include providing, by the profile sharing device, the user profile information associated with the unique identifier to the requester device based on receiving information to authenticate the identity associated with the user operating the user device and verify that the user authorizes supplying the user profile information to the requester device.

Some implementations described herein relate to a non-transitory computer-readable medium that stores a set of instructions. The set of instructions, when executed by one or more processors of a profile sharing device, may cause the profile sharing device to store user profile information associated with a unique identifier. The set of instructions, when executed by one or more processors of the profile sharing device, may cause the profile sharing device to receive, from a requester device, a request for the user profile information associated with the unique identifier. The set of instructions, when executed by one or more processors of the profile sharing device, may cause the profile sharing device to communicate with a user device associated with the unique identifier to authenticate an identity associated with a user operating the user device. The set of instructions, when executed by one or more processors of the profile sharing device, may cause the profile sharing device to provide the user profile information associated with the unique identifier to the requester device based on receiving information to authenticate the identity associated with the user operating the user device and verify that the user authorizes supplying the user profile information to the requester device.

BRIEF DESCRIPTION OF THE DRAWINGS

FIG. 4 is a flowchart of an example process associated with using a unique identifier to supply user profile information, in accordance with some embodiments of the present disclosure.

DETAILED DESCRIPTION

Figure 1A:
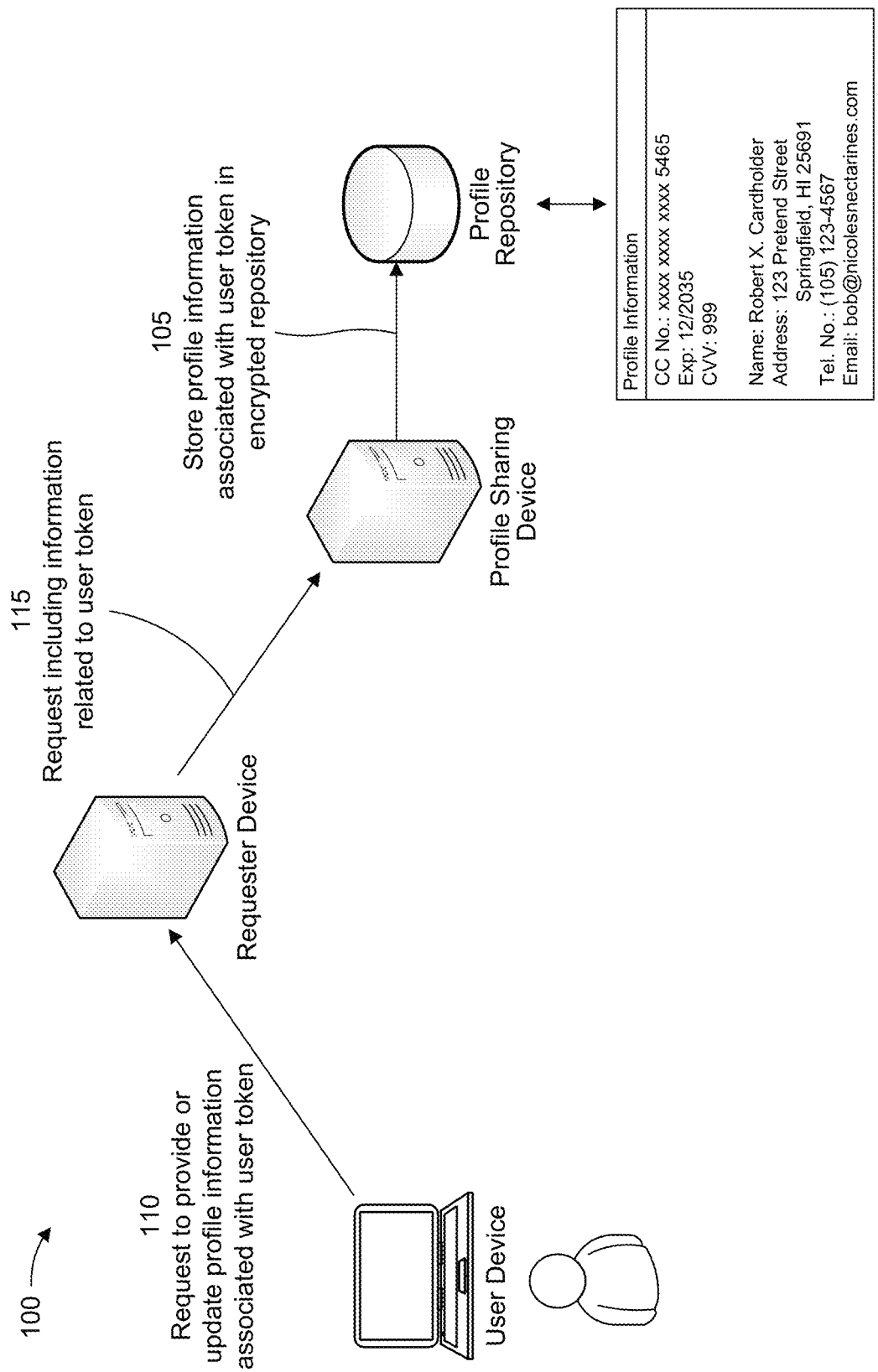
FIGS. 1A-1B are diagrams of an example implementation associated with using a unique identifier to supply user profile information, in accordance with some embodiments of the present disclosure.

The following detailed description of example implementations refers to the accompanying drawings. The same reference numbers in different drawings may identify the same or similar elements.

When a person experiences a change in contact information, there are typically a large number of entities that the person needs to communicate with in order to record the change in contact information. For example, contact information that may be changed may include a name (e.g., after a marriage or divorce), a mailing address (e.g., after relocation), a telephone number, an email address, or the like. Accordingly, to ensure that physical communications (e.g., mail and/or packages) and electronic communication (e.g., text messages, voice calls, and/or emails) are delivered using the correct and most recent contact information, a person may need to notify financial institutions (e.g., banks and credit card companies), insurance carriers, postal services, tax authorities, motor vehicle departments, utility companies, electronic commerce websites, and/or other entities whenever the person experiences a change in contact information. Accordingly, the large number of entities that need to be contacted can often be very difficult to track and manage, which can potentially result in the person missing important communications if the person forgets to update their contact information with one or more entities. Existing approaches to updating contact information generally place the burden on the individual, requiring the person to request mail forwarding through the postal service and communicate with each individual entity to update the contact information, which is tedious and error-prone. Furthermore, to the extent that other solutions such as auto-fills at a browser level allow a user to automatically populate contact information fields on a website, such techniques tend to be insecure and/or inaccurate because the person still needs to manually update the auto-fill settings.

In some implementations, as described herein, a profile sharing device may store current user profile information, including updated or current personal contact information (e.g., a name, mailing address, telephone number, email address, or the like) in an encrypted repository that associates the current personal contact information with a unique identifier associated with the corresponding user. For example, in some implementations, the unique identifier may be a credit card number or other suitable identifier that is linked to current personal contact information, which can then be made available to devices associated with third-party entities that may request access to the current contact information through an application program interface (API) call to the profile sharing device. For example, as described herein, most people hold one or more accounts at a financial institution, which will typically be the first entity, or among the first entities, a person notifies when contact information changes. Furthermore, when a person initially opens an account at a financial institution, the financial institution usually verifies the contact information that the person provides as a prerequisite to opening the account (e.g., by requiring that the person provide a driver's license image or a copy of a utility bill, by checking one or more credit reporting agency records, or the like). Accordingly, the records of the financial institution are highly likely to reflect the most recent contact information associated with a person, whereby some implementations described herein may securely store current contact information associated with a user in an encrypted repository and subsequently allow the user to use a unique identifier (e.g., a credit card number) linked to the current contact information to supply the contact information to a requester device (e.g., associated with an electronic commerce website, a utility provider, or another suitable entity).

For example, the user may request that the profile sharing device supply the user profile information (e.g., name, address, telephone number, or the like) to the requester device in connection with a request to use the unique identifier (e.g., the credit card number) in a transaction facilitated through the requester device. In some implementations, the profile sharing device may then communicate with the user device to authenticate an identity of a user operating the user device (e.g., to verify that the user operating the user device is actually the person associated with the unique identifier linked to the requested contact information). In some implementations, based on the profile sharing device verifying the identity of the user operating the user device, the profile sharing device may then supply the requested user profile information to the requester device for use in any suitable application (e.g., updating a shipping addressed used for electronic commerce, updating the mailing address or email address where statements or promotional materials are sent, updating the address associated with a utility account, or the like). In this way, the profile sharing device may provide a scalable solution to store current user profile information that can be easily shared with a large number of entities. For example, any suitable website or application that uses the API provided by the profile sharing device may provide an interface that allows a user to supply current contact information via the profile sharing device (e.g., as part of a checkout process to perform a credit card transaction or a portal that uses a credit card authorization technique to request the current contact information). Additionally, or alternatively, the API call to request and/or provide the current contact information associated with a user may be automatically included in a request to authorize use of the credit card information such that a response to the requester device includes the most recent contact information along with the transaction approval. In this way, the current contact information may be easily and/or automatically provided to any suitable entity that may need or request access to the contact information associated with a user.

Figure 1B:
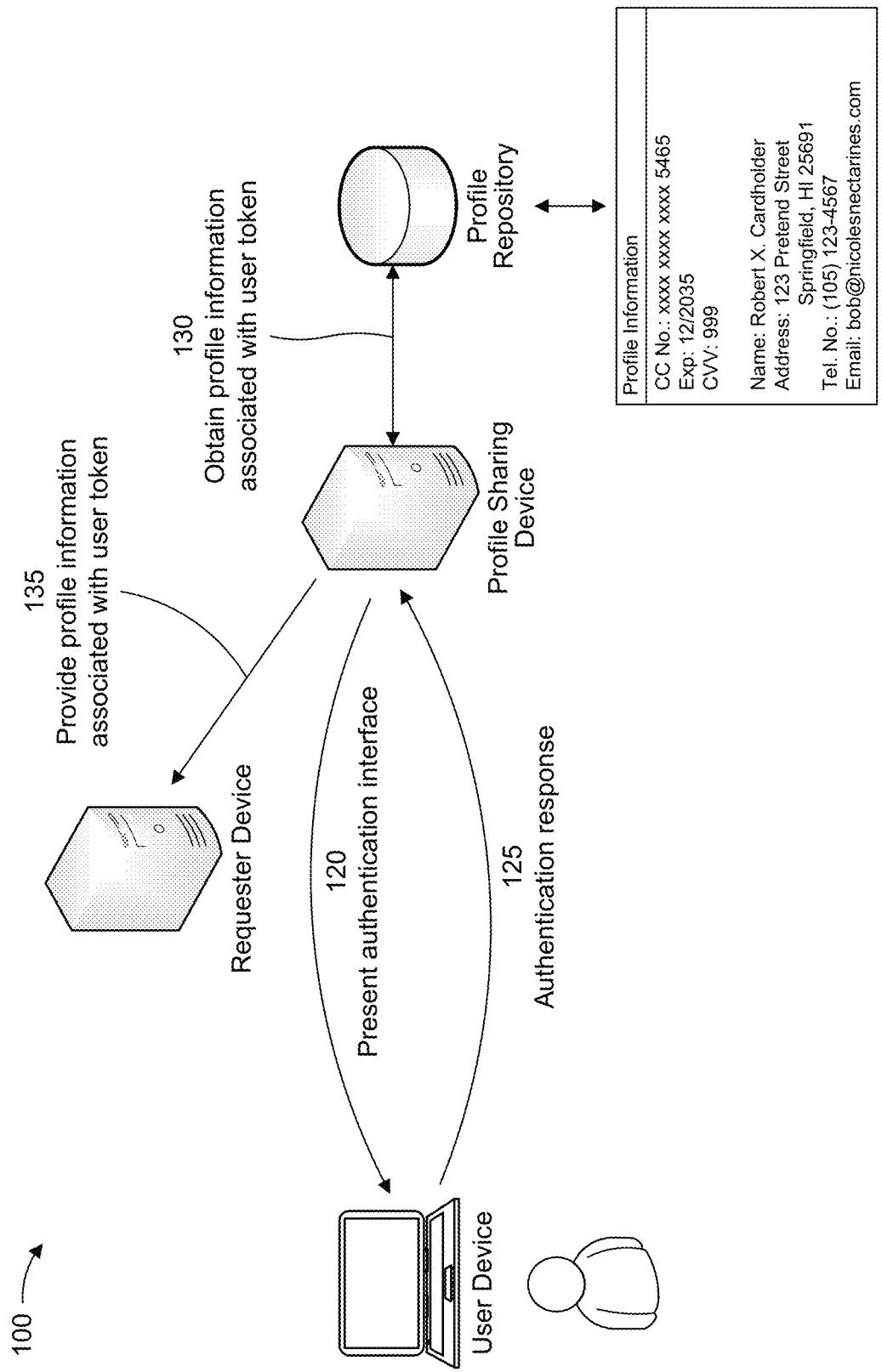

FIGS. 1A-1B are diagrams of an example 100 associated with using a unique identifier to supply user profile information. As shown in FIGS. 1A-1B, example 100 includes a profile sharing device, a user device, and a requester device. The profile sharing device, user device, and a requester device devices are described in more detail in connection with FIGS. 2-3.

As shown in FIG. 1A, and by reference number 105, the profile sharing device may store profile information associated with a user token in an encrypted profile repository. For example, as shown in FIGS. 1A-1B and described herein, the profile information stored in the profile repository may generally include personal contact information, such as a name, one or more mailing addresses (e.g., personal and/or business addresses), one or more telephone numbers (e.g., home, mobile, and/or work numbers), and/or one or more email addresses (e.g., primary, alternate, work, and/or other email addresses), among other examples. Furthermore, as shown in FIGS. 1A-1B and described herein, the user token that is associated with the profile information may include a credit card number associated with the user, although it will be appreciated that any suitable unique identifier may be used (e.g., a social security number or driver's license number that is uniquely associated with one person). For example, when a person establishes a credit card account with a financial institution, the person typically has to provide their name, address, telephone number, and other contact details to be associated with the credit card account. Accordingly, because most people have a credit card account and tend to keep their contact information with financial institutions current (e.g., with financial institutions often being the first or among the first entities a person notifies when contact information changes), a credit card number may be used as the user token (or unique identifier) associated with the contact information. Furthermore, because financial institutions usually verify the contact information that a person provides when opening a credit card account (e.g., by requiring that the person provide a driver's license image or a copy of a utility bill, by checking one or more credit reporting agency records, or the like), the records associated with a credit card number or credit card account are likely to provide reliable, current, and identity-verified contact information associated with a person.

For example, the profile sharing device may be associated with a financial institution that issues or manages credit card accounts, whereby the profile information in the profile repository may be maintained in a current state based on records of the financial institution. For example, whenever a user submits a request to change or update contact information to the financial institution, the change or update may be propagated to the encrypted records stored in the profile repository. Furthermore, in some implementations, the profile sharing device may interface with one or more credit bureau devices (e.g., Experian, Equifax, and/or TransUnion) to verify the contact information associated with a user and/or to determine potential variations and/or updates in the contact information (e.g., different names, addresses, or other information that are associated with one or more active or closed accounts associated with the user). Additionally, or alternatively, the profile sharing device may aggregate profile information from various financial institutions to increase the quantity of users that have current contact information stored in the profile repository. In such cases, the profile sharing device may encrypt the contents of the profile repository and maintain the profile repository separately from any other systems that are associated with the unique identifier (e.g., transaction backend systems that are used to authorize credit card transactions) to protect user privacy and secure the user profile information against unauthorized access or distribution. For example, the profile sharing device may store the current contact information associated with a user in the profile repository in an encrypted form such that the users can authorize that the current contact information be supplied to a third-party requester without the profile sharing device having explicit access to the contact information (e.g., the profile sharing device may be unable to decrypt the profile information stored in the profile repository, because the profile information may only be decrypted using information associated with the user token or other unique identifier linked to the encrypted profile information).

As further shown in FIG. 1A, and by reference number 110, the requester device may receive a request to provide or update profile information associated with a unique identifier associated with a user, such as a credit card number used as a user token. For example, in some implementations, the requester device may correspond to a web server or another suitable device that hosts a website that provides a front-end interface that enables a user to provide or update contact information based on the profile information stored in the profile repository. For example, in some implementations, the website may be associated with a postal service, an electronic commerce service provider, a utility company, a cable and/or internet service provider, a subscription service, an insurance company, a governmental agency, an employer human resources system, a financial institution, a motor vehicles department, a medical service provider, a charitable organization, or any other entity that may have a use for communicating with the user via one or more physical or electronic channels.

Accordingly, in some implementations, the requester device may provide a capability to process one or more credit card transactions, and may provide the front-end interface that enables the user to provide or update contact information based on the profile information stored in the profile repository in connection with a checkout page or other transaction processing interface. In such cases, the transaction processing interface may include one or more fields that allow the user to enter credit card information to complete a transaction, update an automatic payment method, or the like, and the transaction processing interface may also include an option that allows the user to authorize obtaining appropriate contact information (e.g., a current name, address, telephone number, and/or email address) from the profile repository. For example, in some implementations, the transaction processing interface may include a checkbox or another suitable user interface element that allows the user to request that the requester device obtain, from the profile repository, current contact information associated with a credit card number used in the transaction processing interface. Additionally, or alternatively, the interface that enables the user to provide or update contact information based on the profile information stored in the profile repository may be independent of any credit card transaction (e.g., the user interface may generally allow the user to use a credit card number to supply or update contact information using the profile information that is linked to the credit card number, which is used like a single sign-on mechanism to provide or update contact information to any suitable entity).

Accordingly, when a user desires to provide an entity with current contact information, which may include a current name, a current address, a current telephone number, a current email address, or the like, the user may use the user device to communicate with the requester device and provide authorization to obtain the current contact information from the profile repository based on a credit card number or another suitable unique identifier associated with the user. For example, the user may use the user device to navigate to a website associated with the entity and access a checkout page, an account information page, or another suitable page that allows the credit card number to be used to supply the current contact information. Additionally, or alternatively, the user device may interact with the requester device via one or more local applications that execute on the user device (e.g., an application that provides a payment portal or other suitable interface to enter payment information). Additionally, or alternatively, the user may interact with a point-of-sale terminal that provides a suitable interface to supply current contact information using the credit card number (e.g., the requester device may be a tablet, a computer, or another suitable device that can accept credit card payments at a point-of-sale).

As further shown in FIG. 1A, and by reference number 115, the profile sharing device may receive, from the requester device, a request that includes information related to the user token associated with the profile information being requested. For example, in some implementations, the profile sharing device may implement one or more APIs that enable the requester device to request profile information associated with a unique identifier associated with a user, such as a credit card number or other token uniquely associated with the user. Accordingly, when the user submits the request to provide the current contact information to the requester device, the requester device may use the credit card number or other unique identifier provided by the user in an API call to the profile sharing device. For example, the API call may include a request for current contact information associated with the credit card number or other unique identifier, which may be a separate API call from a request for authorization to use the credit card number in a transaction (e.g., the requester device may submit a first API call to a transaction backend system that requests authorization to use the credit card number in a transaction associated with a merchant for a given amount, and may submit a second API call to the profile sharing device to request the most current contact information associated with the credit card number). Additionally, or alternatively, the request for authorization to use the credit card number and the request for the current contact information may be combined within a single API call. For example, the request for the current contact information may be configured to be included in the request for authorization to use the credit card such that the contact information associated with the user is automatically updated with the requester device upon approving the credit card transaction. Additionally, or alternatively, in cases where the profile sharing device enables user contact information associated with a credit card number to be shared independent from (e.g., in the absence of) any associated credit card transaction, there may be only one API call from the requester device to the profile sharing device (e.g., to request the most current contact information linked to the associated credit card number).

As shown in FIG. 1B, and by reference number 120, the profile sharing device may present an authentication interface to the user device based on the API call(s) in which the requester device requests the current contact information associated with the user. For example, as described herein, the unique identifier that is linked to the current contact information may be a credit card number, which may be associated with a personal identification number (PIN) that is included with the request for the updated profile information. Accordingly, the credit card number linked to the current contact information may be associated with a transaction history, and the authentication interface presented to the user device may include one or more challenges that are used to verify the identify of the user operating the user device based on the transaction history. For example, as described herein, the profile information stored in the profile repository may include current names, addresses, telephone numbers, email addresses, or the like associated with different credit card numbers that are uniquely associated with a user, and each credit card number may be associated with a transaction history at a corresponding financial institution.

Accordingly, in cases where the PIN number included with the request matches a PIN associated with the credit card number, the transaction history may be used to derive the one or more challenges that are presented via the authentication interface, such as challenging the user to indicate or select one or more merchants where the user conducted a number of transactions in a recent time period (e.g., three merchants where the credit card was used within the last week). For example, if the user is the actual person who owns or is otherwise authorized to use the credit card, the user may be expected to have the knowledge to answer the challenges that are based on the recent transaction history. Additionally, or alternatively, the user may have the option to use any other suitable authentication mechanism to prove that the user is the owner of the credit card number. For example, the profile sharing device may send a one-time pin or a one-time password (OTP) to the user device, which the user may be required to enter into the authentication interface in order to prove that they are the person associated with the credit card account. Alternatively, in cases where the initial request from the requester device does not include the correct PIN number or other security information associated with the credit card number, the profile sharing device may deny the request for the updated profile information without presenting the authentication interface to the user device.

As further shown in FIG. 1B, and by reference number 125, the profile sharing device may receive an authentication response from the user device. For example, in some implementations, the authentication interface may present one or more challenge questions to the user device that are based on the recent transaction history associated with the credit card number being used to supply current contact information to the requester device, and the authentication response may include responses to the one or more challenge questions. For example, the one or more challenge questions may ask the user of the user device to input, or to select from a list of multiple choice options, one or more merchants where the user performed credit card transactions within a recent time period, one or more approximate values of transactions that were performed within a recent time period (e.g., in cases where one or more transactions were associated with an atypical or noteworthy amount, such as several hundred or thousands of dollars that are expected to stand out in the user's memory), or the like. In such cases, the authentication response may include the user's responses to the challenge questions, whereby the identity of the user may be authenticated based on the user's responses to the challenge questions matching the information in the recent transaction history or not authenticated based on one or more mismatches between the user's responses to the challenge questions and the information in the recent transaction history. Additionally, or alternatively, the authentication interface may be an interface that is able to receive an OTP or a one-time code input, and the authentication response may include an OTP or one-time code input into the authentication interface. In such cases, the identity of the user may be authenticated based on the OTP or one-time code entered into the authentication interface matching the OTP or one-time code sent to the user device or not authenticated based on a mismatch between the OTP or one-time code entered into the authentication interface and the OTP or one-time code sent to the user device. Although some implementations are described herein as using challenge questions or an OTP as the authentication mechanism to verify the identity of the user, it will be appreciated that any suitable identity-verification technique may be used.

As further shown in FIG. 1B, and by reference number 130, the profile sharing device may obtain the current contact or profile information associated with the credit card number used as the user token in cases where the user is able to successfully authenticate their identity via the authentication interface. In such cases, as further shown in FIG. 1B, and by reference number 135, the profile sharing device may then provide the requested contact or profile information to the requester device. For example, in some implementations, the contact or profile information provided to the requester device may include a name, an address, a telephone number, an email address, or any other suitable contact information, which the requester device can then use for any suitable purpose. For example, the contact or profile information may be used to update a shipping address or a mailing address where physical packages or mail is sent for the user, a billing address used for the credit card number, the telephone number for contacting the user, and/or the email address where electronic correspondence is sent to the user, among other examples. Furthermore, in some implementations, the contact or profile information may be sent to the requester device in an encrypted form, and the requester device may be provided with suitable information to enable the requester device to decrypt or otherwise access the contact or profile information (e.g., using public key infrastructure or other suitable encryption techniques). Additionally, or alternatively, in some cases, the profile sharing device may maintain a record that indicates when updated contact or profile information was most recently sent to the requester device, and the profile sharing device may send the updated contact or profile information to the requester device only in cases where the contact or profile information has been recently updated (e.g., where the requester device is associated with an electronic commerce provider or other entity that accepts credit card payments, and the contact or profile information is changed after a most recent request for approval to use the credit card number in a transaction).

In this way, the profile sharing device may provide a scalable solution to store current user profile information that can be easily shared with a large number of entities. For example, any suitable website or application that uses the API provided by the profile sharing device may provide an interface that allows a user to supply current contact information via the profile sharing device (e.g., as part of a checkout process to perform a credit card transaction or a portal that uses a credit card authorization technique to request the current contact information). Additionally, or alternatively, the API call to request and/or provide the current contact information associated with a user may be automatically included in a request to authorize use of the credit card information such that a response to the requester device includes the most recent contact information along with the transaction approval. In this way, the current contact information may be easily and/or automatically provided to any suitable entity that may need or request access to the contact information associated with a user.

As indicated above, FIGS. 1A-1B are provided as an example. Other examples may differ from what is described with regard to FIGS. 1A-1B.

Figure 2:
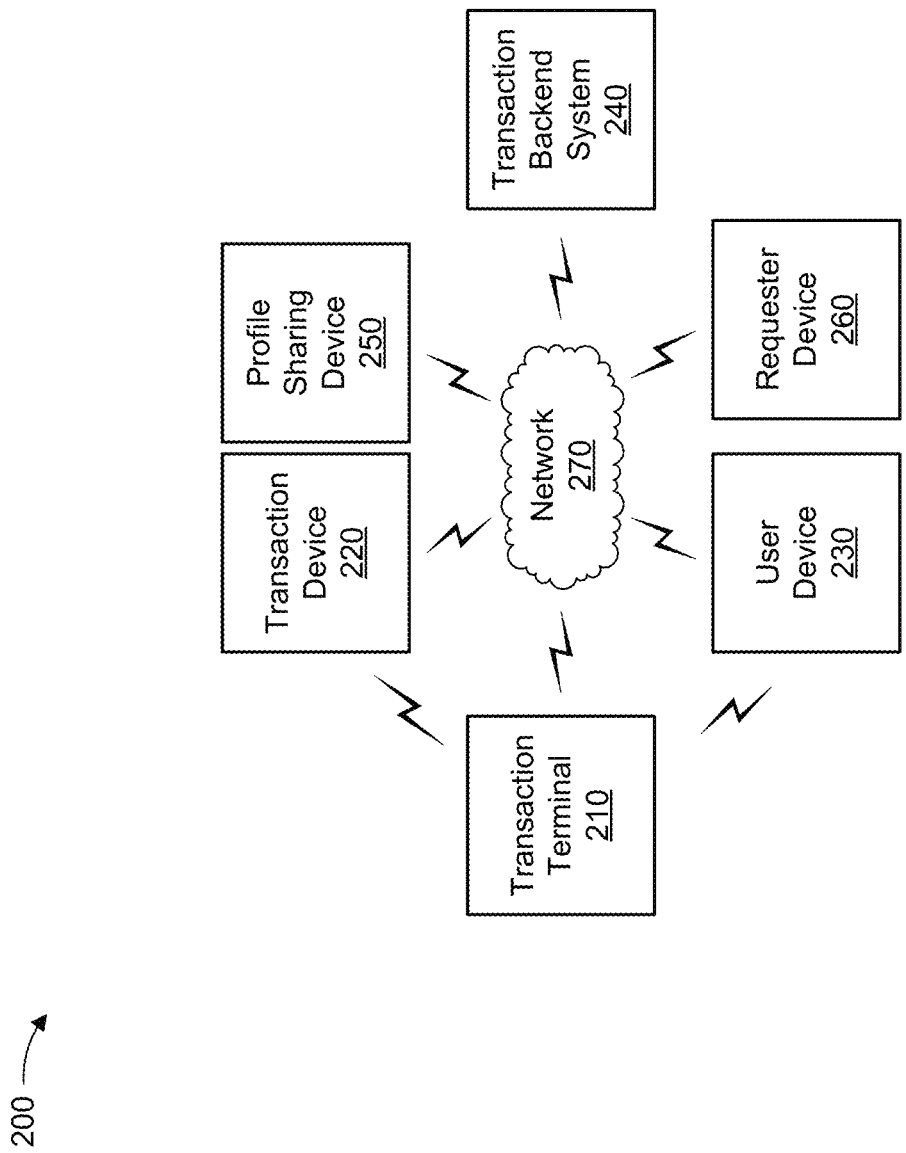
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a transaction terminal 210, a transaction device 220, a user device 230, a transaction backend system 240, a profile sharing device 250, a requester device 260, and/or a network 270. Devices of environment 200 may interconnect via wired connections and/or wireless connections.

The transaction terminal 210 may include one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 may include one or more devices capable of being used for an electronic transaction. In some implementations, the transaction device 220 may include a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the user device 230 or may be integrated into the user device 230. For example, the user device 230 may execute an electronic payment application capable of performing functions of the transaction device 220 described herein. Thus, one or more operations described herein as being performed by the transaction device 220 may be performed by a transaction card, the user device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The user device 230 may include one or more devices capable of being used for an electronic transaction, as described above in connection with the transaction device 220. The user device 230 may include a communication device and/or a computing device. For example, the user device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 230 may be capable of receiving, requesting, generating, storing, processing, and/or providing information associated with a user profile (e.g., user contact information) and/or a unique identifier (e.g., a payment credential or token) associated with a user of the user device 230 and/or the transaction device 220, as described elsewhere herein.

The transaction backend system 240 may include one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The profile sharing device 250 may include one or more devices capable of receiving, requesting, generating, storing, processing, providing, and/or routing information associated with a user profile (e.g., user contact information) and/or a unique identifier (e.g., a payment credential or token) associated with a user profile, as described elsewhere herein. The profile sharing device 250 may include a communication device and/or a computing device. For example, the profile sharing device 250 may include a server, such as an application server, a client server, a web server, a database server, a host server, a proxy server, a virtual server (e.g., executing on computing hardware), or a server in a cloud computing system. In some implementations, the profile sharing device 250 may include computing hardware used in a cloud computing environment.

The requester device 260 may include one or more devices capable of receiving, requesting, generating, storing, processing, providing, and/or routing information associated with a user profile (e.g., user contact information) and/or a unique identifier (e.g., a payment credential or token) associated with a user profile, as described elsewhere herein. The requester device 260 may include a communication device and/or a computing device. For example, the requester device 260 may include a server, such as an application server, a client server, a web server, a database server, a host server, a proxy server, a virtual server (e.g., executing on computing hardware), or a server in a cloud computing system. In some implementations, the requester device 260 may include computing hardware used in a cloud computing environment. Additionally, or alternatively, the requester device 260 may include a user device, such as a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or the like.

The network 270 may include one or more wired and/or wireless networks. For example, the network 270 may include a cellular network, a public land mobile network, a local area network, a wide area network, a metropolitan area network, a telephone network, a private network, the Internet, and/or a combination of these or other types of networks. The network 270 enables communication among the devices of environment 200. In some implementations, the transaction terminal 210 may communicate with the transaction device 220 and/or the user device 230 using a first network (e.g., a contactless network or by coming into contact with the transaction device 220 and/or the user device 230) and may communicate with the transaction backend system 240 using a second network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
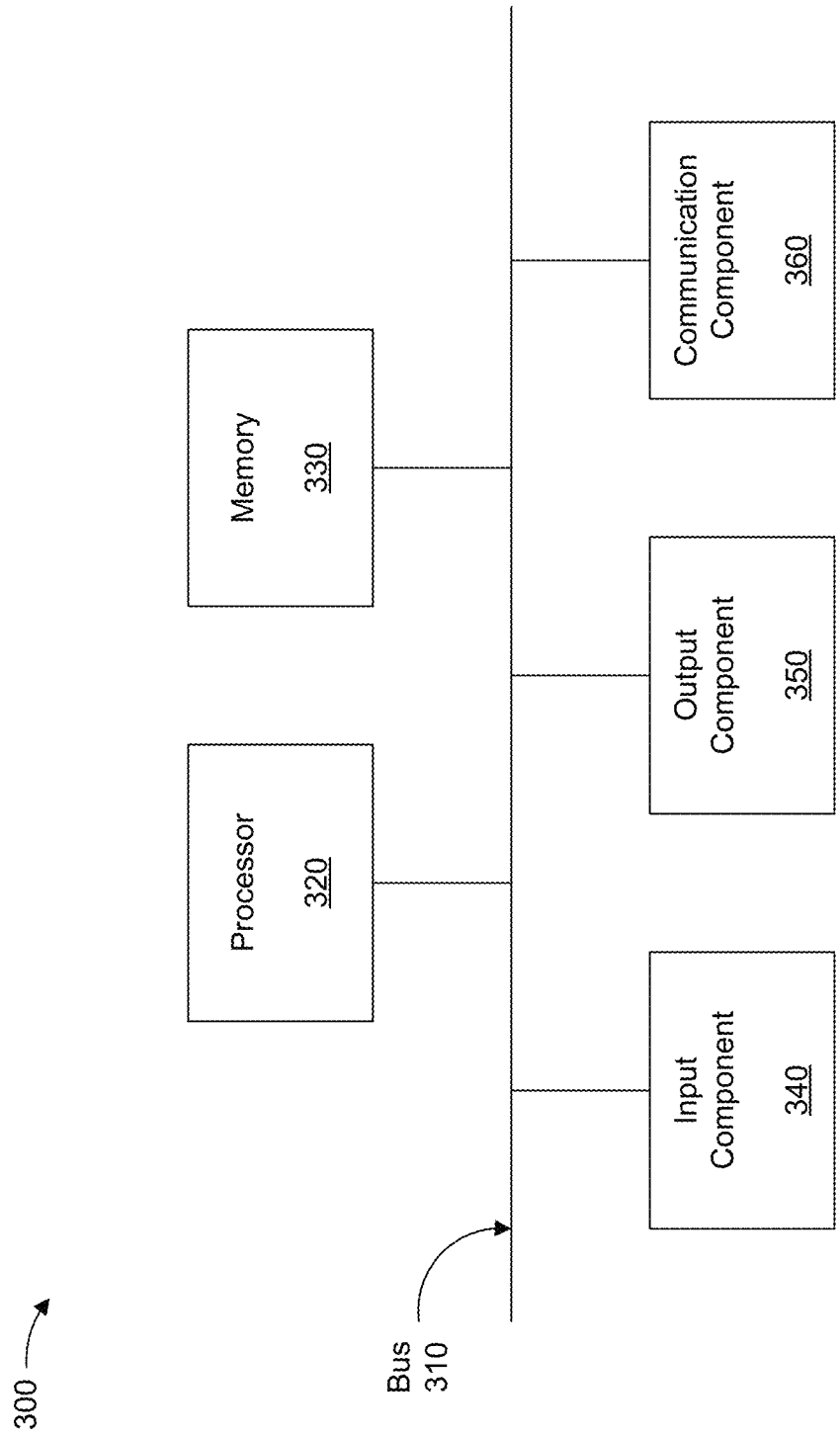
FIG. 3 is a diagram of example components of one or more devices of FIG. 2, in accordance with some embodiments of the present disclosure.

FIG. 3 is a diagram of example components of a device 300 associated with using a unique identifier (e.g., a credit card number, payment token, or other credential) to supply user profile information (e.g., user contact information). The device 300 may correspond to the transaction terminal 210, the transaction device 220, the user device 230, the transaction backend system 240, the profile sharing device 250, and/or the requester device 260. In some implementations, the transaction terminal 210, the transaction device 220, the user device 230, the transaction backend system 240, the profile sharing device 250, and/or the requester device 260 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with associated with using a unique identifier (e.g., a credit card number, payment token, or other credential) to supply user profile information (e.g., user contact information). In some implementations, one or more process blocks of FIG. 4 may be performed by the profile sharing device described herein. In some implementations, one or more process blocks of FIG. 4 may be performed by another device or a group of devices separate from or including the profile sharing device, such as the transaction terminal, transaction device, user device, transaction backend system, and/or requester device described herein. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include storing, in an encrypted data repository, user profile information associated with a unique identifier (block 410). For example, the profile sharing device (e.g., using processor 320 and/or memory 330) may store, in an encrypted data repository, user profile information associated with a unique identifier, as described above in connection with reference number 105 of FIG. 1A. As an example, the profile sharing device may receive user profile information, such as a name, mailing address, telephone number, email address, or the like, which may be associated with a unique identifier associated with a user, such as a credit card number, a token, a credential, or other suitable information that is linked to the user profile information, and an association between the user profile information and the linked unique identifier may be stored in an encrypted repository to make the user profile information available to one or more requester devices.

As further shown in FIG. 4, process 400 may include receiving, from a requester device, a request for the user profile information associated with the unique identifier, wherein the request for the user profile information is associated with an API call requesting approval to use the unique identifier (block 420). For example, the profile sharing device (e.g., using processor 320, memory 330, input component 340, and/or communication component 360) may receive, from a requester device, a request for the user profile information associated with the unique identifier, wherein the request for the user profile information is associated with an API call requesting approval to use the unique identifier, as described above in connection with reference number 115 of FIG. 1A. As an example, a user device may communicate with the requester device, which may correspond to an electronic commerce website, a human resources management website, a utility website, a tax authority website, a voter registration website, a terminal, or another suitable device that needs or requests access to contact information included in a user profile, and the requester device may communicate with the profile sharing device to request the appropriate contact information using an API call.

As further shown in FIG. 4, process 400 may include communicating with a user device associated with the unique identifier to authenticate an identity associated with a user operating the user device (block 430). For example, the profile sharing device (e.g., using processor 320 and/or memory 330) may communicate with a user device associated with the unique identifier to authenticate an identity associated with a user operating the user device, as described above in connection with reference numbers 120 and 125 of FIG. 1B. As an example, the profile sharing device may present the user device with one or more challenge questions (e.g., asking the user to provide information related to one or more recent transactions that were performed using a credit card associated with the unique identifier), may send a one-time code or one-time password to the user device, or may otherwise communicate with the user device to verify that the user of the user device is the same person that is associated with the unique identifier and/or authorized to supply user profile information to the requester device.

As further shown in FIG. 4, process 400 may include providing the user profile information associated with the unique identifier to the requester device based on receiving information to authenticate the identity associated with the user operating the user device and verify that the user authorizes supplying the user profile information to the requester device (block 440). For example, the profile sharing device (e.g., using processor 320 and/or memory 330) may provide the user profile information associated with the unique identifier to the requester device based on receiving information to authenticate the identity associated with the user operating the user device and verify that the user authorizes supplying the user profile information to the requester device, as described above in connection with reference number 135 of FIG. 1B. As an example, after the profile sharing device has authenticated the identity of the user operating the user device, the user profile information requested by the requester device (e.g., the name, address, telephone number, or other suitable information) may be provided to the requester device (e.g., for use in updating the user's contact information).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for supplying user profile information, the system comprising:
one or more memories; and
one or more processors, coupled to the one or more memories, configured to:
store, in an encrypted data repository that is separate from a transaction system, updated user profile information associated with a unique identifier;
receive via a first application program interface (API) between the system and a requester device, and based on accessing a webpage associated with a transaction, a request for authorization from the transaction system to use the unique identifier for completing the transaction,
wherein the first API is a first specialized API for requesting authorization from the transaction system to use the unique identifier for completing the transaction;
receive, from the requester device, via a second API between the system and the requester device, and based on accessing the webpage associated with the transaction, a request for the updated user profile information associated with the unique identifier,
wherein the second API is a second specialized API for requesting the updated user profile information associated with the unique identifier, from the encrypted data repository, and
wherein the requester device is configured to process one or more transactions with a user;
communicate, based on a third API between the system and a user device, with the user device,
wherein the user device is associated with the unique identifier to authenticate an identity associated with the user operating the user device, and
wherein the third API is a third specialized API for authenticating the identity;
obtain, based on communicating via the third API to authenticate the identity associated with the user operating the user device and based on verifying that the user authorizes supplying the updated user profile information to the requester device, the updated user profile information from the encrypted data repository; and
provide, based on obtaining the updated user profile information, the updated user profile information to the requester device.

2. The system of claim 1, wherein the unique identifier is a credit card number.

3. The system of claim 1, wherein the updated user profile information includes one or more of a name, an address, a telephone number, or an email address associated with the unique identifier.

4. The system of claim 1, wherein the one or more processors, to communicate with the user device to authenticate the identity associated with the user, are configured to:
present, to the user device, an interface that includes one or more challenges to verify that the user operating the user device is a person associated with the unique identifier; and
receive, via the interface, one or more responses to the one or more challenges, wherein the one or more responses include the user profile information used to authenticate the identity associated with the user operating the user device.

5. The system of claim 1, wherein the one or more processors, to communicate with the user device to authenticate the identity associated with the user, are configured to:
send, to the user device, a one-time code to be input into an interface associated with the request for the updated user profile information,
wherein the identity associated with the user operating the user device is authenticated based on the user inputting the one-time code into the interface associated with the request for the updated user profile information.

6. The system of claim 1, wherein the one or more processors are configured to communicate with the user device to authenticate the identity associated with the user based on the request for the updated user profile information including a personal identification number associated with the unique identifier.

7. The system of claim 1, wherein the updated user profile information is provided to the requester device based on a determination that the updated user profile information has been updated subsequent to a most recent approval request received from the requester device.

8. The system of claim 1, wherein the updated user profile information is provided to the requester device in an encrypted form.

9. A method for sharing updated user profile information, comprising:
storing, by a profile sharing device and in an encrypted data repository that is separate from a transaction system, updated user profile information associated with a unique identifier;
receiving, via a first application program interface (API) between the profile sharing device and a requester device, and based on accessing a webpage associated with a transaction, a request for authorization from the transaction system to use the unique identifier for completing the transaction,
wherein the first API is a first specialized API for requesting authorization to use the unique identifier for completing the transaction;
receiving, by the profile sharing device from the requester device, via a second API between the profile sharing device and the requester device, and based on accessing the webpage associated with the transaction, a request for the updated user profile information associated with the unique identifier,
wherein the second API is a second specialized API for requesting the updated user profile information associated with the unique identifier, from the encrypted data repository, and
wherein the requester device is configured to process one or more transactions with a user;
communicating, by the profile sharing device and based on a third API between the profile sharing device and a user device, with the user device associated with the unique identifier to authenticate an identity associated with the user operating the user device,
wherein the third API is a third specialized API for authenticating the identity;
obtaining, by the profile sharing device and based on communicating via the third API to authenticate the identity associated with the user operating the user device and based on verifying that the user authorizes supplying the updated user profile information to the requester device, the updated user profile information from the encrypted data repository; and
providing, by the profile sharing device and based on obtaining the updated user profile information, the updated user profile information to the requester device.

10. The method of claim 9, wherein the updated user profile information includes one or more of a name, an address, a telephone number, or an email address associated with the unique identifier.

11. The method of claim 9, wherein communicating with the user device to authenticate the identity associated with the user comprises:
presenting, to the user device, an interface that includes one or more challenges to verify that the user operating the user device is a person associated with the unique identifier; and
receiving, via the interface, one or more responses to the one or more challenges,
wherein the one or more responses include the user profile information used to authenticate the identity associated with the user operating the user device.

12. The method of claim 9, wherein communicating with the user device to authenticate the identity associated with the user comprises:
sending, to the user device, a one-time code to be input into an interface associated with the request for the updated user profile information,
wherein the identity associated with the user operating the user device is authenticated based on the user inputting the one-time code into the interface associated with the request for the updated user profile information.

13. The method of claim 9, wherein the profile sharing device communicates with the user device to authenticate the identity associated with the user based on the request for the updated user profile information including a personal identification number associated with the unique identifier.

14. The method of claim 9, wherein the updated user profile information is provided to the requester device based on a determination that the updated user profile information has been updated subsequent to a most recent approval request received from the requester device.

15. A non-transitory computer-readable medium storing a set of instructions, the set of instructions comprising:
one or more instructions that, when executed by one or more processors of a profile sharing device, cause the profile sharing device to:
store, in an encrypted data repository that is separate from a transaction system, updated user profile information associated with a unique identifier;
receive via a first application program interface (API) between the profile sharing device and a requester device, and based on accessing a webpage associated with a transaction, a request for authorization from the transaction system to use the unique identifier for completing the transaction,
wherein the first API is a first specialized API for requesting authorization to use the unique identifier for completing the transaction;
receive, from the requester device and via a second API between the profile sharing device and the requester device, a request for the updated user profile information associated with the unique identifier,
wherein the second API is a second specialized API for requesting the updated user profile information associated with the unique identifier, from the encrypted data repository, and
wherein the requester device is configured to process one or more transactions with a user;

communicate, based on a third API between the profile sharing device and a user device, with the user device associated with the unique identifier to authenticate an identity associated with the user operating the user device,
wherein the third API is a third specialized API for authenticating the identity;

obtain, based on communicating via the third API to authenticate the identity associated with the user operating the user device and based on verifying that the user authorizes supplying the updated user profile information to the requester device, the updated user profile information from the encrypted data repository; and provide, based on obtaining the updated user profile information, the updated user profile information to the requester device.

16. The non-transitory computer-readable medium of claim 15, wherein the updated user profile information includes one or more of a name, an address, a telephone number, or an email address associated with the unique identifier.

17. The non-transitory computer-readable medium of claim 15, wherein the one or more instructions, that cause the profile sharing device to communicate with the user device to authenticate the identity associated with the user, cause the profile sharing device to:

present, to the user device, an interface that includes one or more challenges to verify that the user operating the user device is a person associated with the unique identifier; and receive, via the interface, one or more responses to the one or more challenges,
wherein the one or more responses include the user profile information used to authenticate the identity associated with the user operating the user device.

18. The non-transitory computer-readable medium of claim 15, wherein the one or more instructions, that cause the profile sharing device to communicate with the user device to authenticate the identity associated with the user, cause the profile sharing device to:

send, to the user device, a one-time code to be input into an interface associated with the request for the updated user profile information,
wherein the identity associated with the user operating the user device is authenticated based on the user inputting the one-time code into the interface associated with the request for the updated user profile information.

19. The non-transitory computer-readable medium of claim 15, wherein the one or more instructions cause the profile sharing device to communicate with the user device to authenticate the identity associated with the user based on the request for the updated user profile information including a personal identification number associated with the unique identifier.

20. The non-transitory computer-readable medium of claim 15, wherein the updated user profile information is provided to the requester device based on the updated user profile information having been updated subsequent to a most recent request received from the requester device.

\* \* \* \* \*